United States Patent
Casu et al.

(10) Patent No.: US 12,107,710 B2
(45) Date of Patent: Oct. 1, 2024

(54) SENSOR SIGNALING OF ABSOLUTE AND INCREMENTAL DATA

(71) Applicant: Allegro MicroSystems, LLC, Manchester, NH (US)

(72) Inventors: Emanuele Andrea Casu, Annecy (FR); Cédric Gillet, Annecy (FR); Nicolás Rigoni, Manchester, NH (US); Florencia Ferrer, Montevideo (UY); Andreas P. Friedrich, Metz-Tessy (FR); Emil Pavlov, Heidelberg (DE)

(73) Assignee: Allegro MicroSystems, LLC, Manchester, NH (US)

( * ) Notice: Subject to any disclaimer, the term of this patent is extended or adjusted under 35 U.S.C. 154(b) by 298 days.

(21) Appl. No.: 17/658,872

(22) Filed: Apr. 12, 2022

(65) Prior Publication Data

US 2022/0239462 A1    Jul. 28, 2022

Related U.S. Application Data

(63) Continuation-in-part of application No. 16/952,215, filed on Nov. 19, 2020, now Pat. No. 11,368,533.

(51) Int. Cl.
*H04L 25/49* (2006.01)
*G07C 5/08* (2006.01)
(Continued)

(52) U.S. Cl.
CPC ........ *H04L 25/4902* (2013.01); *G07C 5/0808* (2013.01); *H04L 1/0042* (2013.01); *H04L 7/048* (2013.01)

(58) Field of Classification Search
CPC ... H04L 25/4902; H04L 1/0042; H04L 7/048; G07C 5/0808
See application file for complete search history.

(56) References Cited

U.S. PATENT DOCUMENTS 4,551,676 A    11/1985 Amemiya et al.
4,746,862 A    5/1988 Ueki
(Continued)

FOREIGN PATENT DOCUMENTS

DE    196 34 714 A1    3/1998
DE    196 50 935 A1    6/1998
(Continued)

OTHER PUBLICATIONS

Asilomar, "Fifty-First Asilomar Conference on Signals, Systems, and Computers;" Final Program and Abstracts; Oct. 29-Nov. 1, 2017; Part 1 of 2; 70 Pages.
(Continued)

*Primary Examiner* — Chandrahas B Patel
(74) *Attorney, Agent, or Firm* — Daly, Crowley, Mofford & Durkee, LLP

(57) ABSTRACT

A sensor integrated circuit (IC) includes a sensing element configured to sense a parameter associated with a target, a processor coupled to the sensing element and configured to generate a sensed signal indicative of the parameter associated with the target, and an output module coupled to receive the sensed signal. The output module is configured to transmit absolute data on a message line at a first rate and transmit incremental data on one or more index lines at a second rate, wherein the second rate is faster than the first rate, wherein the incremental data comprises data associated with changes in the absolute data and wherein an edge or a pulse is used to indicate an incremental change has occurred in the absolute data.

26 Claims, 10 Drawing Sheets

(51) Int. Cl.
  *H04L 1/00*  (2006.01)
  *H04L 7/04*  (2006.01)

(56) References Cited

U.S. PATENT DOCUMENTS

| | | | |
|---|---|---|---|
| 6,542,847 | B1 | 4/2003 | Lohberg et al. |
| 6,687,644 | B1 | 2/2004 | Zinke et al. |
| 6,815,944 | B2 | 11/2004 | Vig et al. |
| 7,026,808 | B2 | 4/2006 | Vig et al. |
| 7,091,876 | B2 | 8/2006 | Steger |
| 7,747,146 | B2 | 6/2010 | Milano et al. |
| 8,122,159 | B2 | 2/2012 | Monreal |
| 8,183,982 | B2 | 5/2012 | Scherr |
| 8,453,518 | B2 | 6/2013 | Diekmann et al. |
| 8,461,782 | B2 | 6/2013 | Ward et al. |
| 8,519,819 | B2 | 8/2013 | Scherr |
| 8,577,634 | B2 | 11/2013 | Donovan et al. |
| 8,729,890 | B2 | 5/2014 | Donovan et al. |
| 8,860,404 | B2 | 10/2014 | Dwyer et al. |
| 8,922,331 | B2 | 12/2014 | Scherr |
| 8,948,280 | B2 | 2/2015 | Hammerschmidt et al. |
| 9,007,054 | B2 | 4/2015 | Friedrich et al. |
| 9,068,859 | B2 | 6/2015 | Dwyer et al. |
| 9,172,565 | B2 | 10/2015 | Cadugan et al. |
| 9,210,015 | B2 | 12/2015 | Scherr et al. |
| 9,222,990 | B2 | 12/2015 | Dwyer et al. |
| 9,252,945 | B2 | 2/2016 | Lewis et al. |
| 9,300,235 | B2 | 3/2016 | Ng et al. |
| 9,444,613 | B2 | 9/2016 | Hammerschmidt et al. |
| 9,455,849 | B2 | 9/2016 | Scherr et al. |
| 9,552,315 | B2 | 1/2017 | Monreal |
| 9,634,715 | B2 | 4/2017 | Scheinkerman et al. |
| 9,664,748 | B2 | 5/2017 | Friedrich et al. |
| 9,667,409 | B2 | 5/2017 | Scherr |
| 9,739,846 | B2 | 8/2017 | Petrie et al. |
| 9,787,495 | B2 | 10/2017 | Vreeland et al. |
| 9,983,045 | B2 | 5/2018 | O'Neill |
| 10,145,908 | B2 | 12/2018 | David et al. |
| 10,184,807 | B2* | 1/2019 | Motz ............... G01R 31/2884 |
| 10,216,559 | B2 | 2/2019 | Fernandez |
| 10,290,608 | B2 | 5/2019 | Latham et al. |
| 10,326,621 | B1 | 6/2019 | Geisler et al. |
| 10,330,499 | B2 | 6/2019 | Elliott et al. |
| 10,436,606 | B2 | 10/2019 | Kerdraon et al. |
| 10,473,486 | B2 | 11/2019 | Doogue et al. |
| 10,480,957 | B2 | 11/2019 | Kerdraon et al. |
| 10,481,218 | B2 | 11/2019 | Prentice et al. |
| 10,495,485 | B2 | 12/2019 | Burdette et al. |
| 10,495,700 | B2 | 12/2019 | Prentice et al. |
| 10,540,221 | B2* | 1/2020 | Shevelenok ........ G06F 11/0736 |
| 10,571,301 | B2 | 2/2020 | Doogue et al. |
| 10,598,514 | B2 | 3/2020 | Pepka et al. |
| 10,635,539 | B2 | 4/2020 | Cook et al. |
| 10,651,147 | B2 | 5/2020 | Latham et al. |
| 10,656,170 | B2 | 5/2020 | Lim et al. |
| 10,670,672 | B2 | 6/2020 | David et al. |
| 10,700,848 | B2 | 6/2020 | Scherr |
| 10,747,708 | B2 | 8/2020 | Kozomora et al. |
| 11,032,100 | B2 | 6/2021 | Scherr |
| 11,079,291 | B2 | 8/2021 | Bertin |
| 11,112,230 | B2 | 9/2021 | Latham et al. |
| 11,112,275 | B2 | 9/2021 | Bertin |
| 11,119,969 | B2 | 9/2021 | Okajima |
| 11,129,666 | B2* | 9/2021 | Messerly ........... A61B 18/1445 |
| 11,194,004 | B2 | 12/2021 | Scheller et al. |
| 11,215,982 | B2 | 1/2022 | Urano et al. |
| 11,221,203 | B1 | 1/2022 | Ferrer et al. |
| 11,326,903 | B1 | 5/2022 | Casu et al. |
| 11,333,486 | B2 | 5/2022 | Rigoni et al. |
| 11,408,755 | B2 | 8/2022 | Bertin |
| 11,435,206 | B2 | 9/2022 | Drouin |
| 11,460,286 | B2 | 10/2022 | Gillet et al. |
| 11,726,180 | B2* | 8/2023 | Hu ......................... G01S 7/497 |
| | | | 356/4.01 |
| 2008/0159467 | A1 | 7/2008 | Kassner |
| 2010/0060268 | A1 | 3/2010 | Tokunaga |
| 2014/0035564 | A1 | 2/2014 | Lee et al. |
| 2015/0295525 | A1 | 10/2015 | Liu et al. |
| 2016/0123769 | A1 | 5/2016 | Nishimoto et al. |
| 2017/0163366 | A1 | 6/2017 | Aichriedler |
| 2018/0283903 | A1 | 10/2018 | Mochizuki |
| 2019/0039643 | A1 | 2/2019 | Oka et al. |
| 2019/0199451 | A1 | 6/2019 | Krall et al. |
| 2019/0306592 | A1 | 10/2019 | Pusheck et al. |
| 2019/0360839 | A1 | 11/2019 | Shao |
| 2020/0180689 | A1 | 6/2020 | Asaka |
| 2020/0244481 | A1 | 7/2020 | Scherr |
| 2020/0378802 | A1* | 12/2020 | Yashan ............... G01D 5/2454 |
| 2020/0386575 | A1 | 12/2020 | Weiland et al. |
| 2021/0057330 | A1 | 2/2021 | Briano et al. |
| 2021/0190545 | A1 | 6/2021 | Utermoehlen et al. |
| 2021/0247213 | A1 | 8/2021 | Metivier et al. |
| 2022/0026243 | A1* | 1/2022 | Howley ............... G01D 5/2457 |
| 2022/0070035 | A1 | 3/2022 | Ferrer et al. |
| 2022/0099463 | A1 | 3/2022 | Schmidt et al. |
| 2024/0110777 | A1 | 4/2024 | Casu et al. |

FOREIGN PATENT DOCUMENTS

| | | |
|---|---|---|
| DE | 199 11 774 A1 | 12/1999 |
| DE | 102019009169 | 12/2020 |
| EP | 0158645 | 2/1988 |
| EP | 0 944 888 A2 | 9/1999 |
| EP | 1490772 | 12/2004 |
| EP | 3 015 994 A1 | 5/2016 |
| JP | 2001-505691 A1 | 4/2001 |
| JP | 4142109 B2 | 8/2008 |
| JP | 2012-145371 A | 8/2012 |
| KR | 2017-0124521 A | 11/2017 |
| WO | WO 98/25148 A2 | 6/1998 |
| WO | WO 01/20351 A1 | 3/2001 |
| WO | WO 2015/126539 A1 | 8/2015 |

OTHER PUBLICATIONS

Asilomar, "Fifty-First Asilomar Conference on Signals, Systems, and Computers;" Final Program and Abstracts; Oct. 29-Nov. 1, 2017; Part 2 of 2; 63 Pages.
PCT International Search Report and Written Opinion dated Aug. 11, 2023 for International Application No. PCT/US2023/064519; 19 Pages.
Renesas Datasheet IPS2200 "Inductive Position Sensor IC"; Jul. 15, 2020; 21 Pages.
Response to European Communication Pursuant to Rule 69 dated May 31, 2022 and Extended European Search Report dated Feb. 3, 2022 for European Application No. 21187747.7; Response Filed Nov. 4, 2022; 20 Pages.
Examination Report dated Nov. 29, 2023 for European Application No. 21187747.7; 5 Pages.
Search Reporting and Written Opinion dated Sep. 4, 2023 for PCT Application No. PCT/US2023/062254; 29 pages.
U.S. Appl. No. 16/952,215, filed Nov. 19, 2020, Kozomora, et al.
White, "A Tutorial for the Digital SENT Interface;" Integrated Device Technology, Inc.; Retrieved from the Internet: https://aws1.disclosure-cdn.com/arduino/original/3X/d/5/d52079ebf8e81b5a95aae835ebaf1257b280f804.pdf on Jan. 18, 2022; Jan. 1, 2014; 4 Pages.
Extended European Search Report (EESR) dated Feb. 3, 2022 for European Application No. 21187747.7; 11 Pages.
Office Action dated Mar. 11, 2022 for U.S. Appl. No. 16/952,215; 8 pages.
Response to Office Action dated Mar. 11, 2022 filed on Apr. 7, 2022 for U.S. Appl. No. 16/952,215; 18 pages.
Notice of Allowance dated May 4, 2022 for U.S. Appl. No. 16/952,215; 9 pages.
PCT Invitation to Pay Additional Fees and Partial Search Report dated Jun. 20, 2023 for International Application No. PCT/US2023/064519; 9 Pages.
U.S. Non-Final Office Action dated Apr. 3, 2024 for U.S. Appl. No. 17/936,469; 24 Pages.

(56) References Cited

OTHER PUBLICATIONS

Response to European Examination Report dated Nov. 29, 2023 filed on Jan. 9, 2024 for European Application No. 21187747.7; 13 Pages.
Response to Non-Final Office Action dated Apr. 3, 2024, filed on Jul. 1, 2024 for U.S. Appl. No. 17/936,469; 11 Pages.
Notice of Allowance dated Jul. 24, 2024 for U.S. Appl. No. 17/936,469, 7 pages.
Intention to Grant dated May 17, 2024 for European Application No. 21187747.7, 7 pages.
U.S. Appl. No. 18/426,449, filed Jan. 30, 2024, Veilleux.
U.S. Appl. No. 18/498,109, filed Oct. 31, 2023, Halawani et al.

\* cited by examiner

| Inc resolution | Δθ (degrees) | Angular resolution (bit) |
|---|---|---|
| 0 | 0.005 | 16 |
| 1 | 0.011 | 15 |
| 2 | 0.022 | 14 |
| 3 | 0.044 | 13 |
| 4 | 0.088 | 12 |
| 5 | 0.176 | 11 |
| 6 | 0.352 | 10 |
| 7 | 0.703 | 9 |
| 8 | 1.406 | 8 |
| 9 | 2.813 | 7 |
| 10 | 5.625 | 6 |
| 11 | 11.25 | 5 |
| 12 | 22.5 | 4 |
| 13 | 45 | 3 |
| 14 | 90 | 2 |
| 15 | 180 | 1 |

SENSOR SIGNALING OF ABSOLUTE AND INCREMENTAL DATA

CROSS-REFERENCE TO RELATED APPLICATIONS

This application is a continuation-in-part of and claims priority to and the benefit of U.S. patent application Ser. No. 16/952,215, entitled "Signaling Between Master and One or More Slave Components to Share Absolute and Incremental Data" and filed on Nov. 19, 2020, the entirety of which is hereby incorporated by reference.

BACKGROUND

Sensors are used to monitor various parameters of a system. For example, in vehicle systems, parameters such as current, speed, angle, linear position, and rotational direction of an article associated with a control module, such as a power steering module, a fuel injection module, and an anti-lock brake module, are often monitored. The sensor output signal is provided to a system controller, such as an Electronic Control Unit (ECU), that processes the sensor output signal and may generate a feedback signal for desired operation of the control module. Conventionally, the sensor updates the sensed parameter periodically and the system controller polls the sensor for data as needed for processing.

SUMMARY

Described herein are sensor integrated circuits (ICs), systems, and techniques for communicating sensor output information including absolute data and incremental data that allow for faster data updating than traditionally possible. The absolute data can include sensor output information about a sensed parameter and the incremental data can indicate changes in the absolute data. The incremental data can take the form of a single signal transition, or edge or multiple signal transitions, or a pulse. Features include error communication by the incremental data, incremental data communication without a dedicated sensor connection, dynamic adjustment of incremental data resolution, and communication of additional information with the incremental data.

According to the disclosure, a sensor integrated circuit (IC) includes a sensing element configured to sense a parameter associated with a target, a processor coupled to the sensing element and configured to generate a sensed signal indicative of the parameter associated with the target, and an output module coupled to receive the sensed signal. The output module is configured to transmit absolute data on a message line at a first rate and transmit incremental data on one or more index lines at a second rate, wherein the second rate is faster than the first rate, wherein the incremental data comprises data associated with changes in the absolute data and wherein an edge or a pulse is used to indicate an incremental change has occurred in the absolute data.

Features may include one or more of the following individually or in combination with other features. The incremental data may include an indication of an error. The absolute data may include a Pulse Width Modulation (PWM) signal. The PWM signal may include an indication of an error. The error indication by the PWM signal may include one or more of changing the PWM signal to a high impedance signal, decreasing a frequency of the PWM signal, and setting a duty cycle of the PWM signal to a predetermined duty cycle. The error indication by the incremental data may include replicating the error indication by the PWM signal. The sensed parameter associated with the target may be a position of the target, the absolute data may be the position of the target, and the incremental data may be a change in the position of the target. The incremental data may include an indication of a direction of movement of the target and wherein a first direction is indicated by a first incremental data pulse width and a second direction is indicated by a second incremental data pulse width and wherein presence of an error comprises a change of a signal level of the incremental data. The incremental data may include an indication of a direction of movement of the target and wherein a first direction is indicated by a first incremental data signal level and a second direction is indicated by a second incremental data signal level and wherein presence of an error comprises a pulse width of the incremental data. The sensor IC may include a hysteresis block configured to provide hysteresis to the index line. Upon start up of the sensor IC, the absolute data has an initial value and wherein the incremental data may have an initial value corresponding to the initial value of the absolute data. A resolution of the incremental change may be adjustable. The resolution of the incremental change can be user-programmable. The sensed parameter associated with the target can be a position of the target, the absolute data can be the position of a target, the incremental data can be a change in the position of the target, and the resolution of the incremental change can be dynamically varied based on a speed of movement of the target. The sensor IC can be coupled to an electronic control unit (ECU) for transmission of the absolute data and the incremental data. The sensing element can include a transmitting coil and a receiving coil. The sensing element can include a magnetic field transducer comprising one or more of a Hall effect element and a magnetoresistance element.

Also described is a sensor integrated circuit (IC) including a sensing element configured to sense a parameter associated with a target, a processor coupled to the sensing element and configured to generate a sensed signal indicative of the parameter associated with the target, and an output module coupled to receive the sensed signal. The output module is configured to transmit absolute data on a message line at a first rate and transmit incremental data on the message line at a second rate, wherein the second rate is faster than the first rate, wherein the incremental data comprises data associated with changes in the absolute data.

Features may include one or more of the following individually or in combination with other features. The absolute data and the incremental data may have at least one of different signal levels or different pulse widths. An edge or a pulse may be used to indicate an incremental change has occurred in the absolute data.

According to a further aspect of the disclosure, a sensor integrated circuit (IC) having a power connection includes a sensing element configured to sense a parameter associated with a target, a processor coupled to the sensing element and configured to generate a sensed signal indicative of the parameter associated with the target, and an output module coupled to receive the sensed signal. The output module is configured to transmit absolute data on a message line at a first rate and transmit incremental data on the power connection at a second rate, wherein the second rate is faster than the first rate, wherein the incremental data comprises data associated with changes in the absolute data.

Features may include one or more of the following individually or in combination with other features. An edge or a pulse may be used to indicate an incremental change has occurred in the absolute data.

According to another aspect of the disclosure, a sensor integrated circuit (IC) includes a sensing element configured to sense a parameter associated with a target, a processor coupled to the sensing element and configured to generate a sensed signal indicative of the parameter associated with the target, and an output module coupled to receive the sensed signal. The output module is configured to transmit absolute data on a message line at a first rate and transmit incremental data on one or more index lines at a second rate, wherein the second rate is faster than the first rate, wherein the incremental data comprises data associated with changes in the absolute data and additional data.

Features may include one or more of the following individually or in combination with other features. The additional data may be associated with at least one of diagnostic data and synchronization data. The incremental data and the additional data may have at least one of different signal levels or different pulse widths.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Described herein are various sensors, systems, and techniques for communicating sensor output information including absolute data and incremental data that allow for faster data updating than traditionally possible. The absolute data can include sensor output information about a sensed parameter and the incremental data can indicate changes in the absolute data. The incremental data can take the form of a single signal transition, or edge or multiple signal transitions, or a pulse. Features include error communication by the incremental data, incremental data communication without a dedicated sensor connection, dynamic adjustment of incremental data resolution, and communication of additional information with the incremental data.

Figure 1:
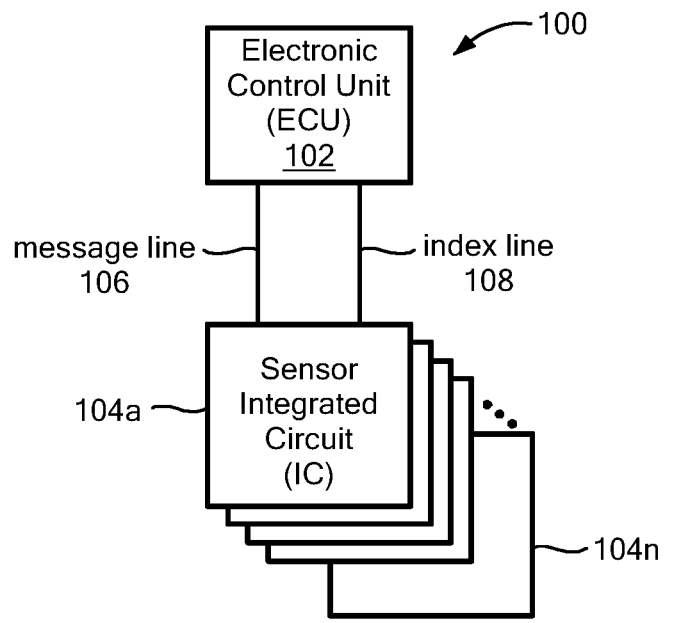
FIG. 1 is a block diagram of a system to transmit absolute data and incremental data that includes an electronic control unit (ECU) and one or more integrated circuits (ICs)

Referring to FIG. 1, a system 100 includes an electronic control unit (ECU) 102 (sometimes referred to as a "master component") and one or more integrated circuits (ICs) 104a-104n (sometimes referred to as "slave components"). The ICs 104a-104n can be sensors of various types, such as, for example, a current sensor, a speed sensor, an angle sensor, a magnetic field sensor, a temperature sensor, a pressure sensor, a chemical sensor, a motion sensor, a rotational direction sensor, a position sensor, an optical sensor, and so forth. ICs 104a-104n may be the same type of sensor (e.g., each a magnetic field sensor) or may be different types of sensors (e.g., one is a temperature sensor and the others are magnetic field sensors). ICs 104a-104n may monitor the same or different target parameters. For simplicity, sensor ICs 104a-104n are described in connection with an example sensor 104a.

Figure 5:
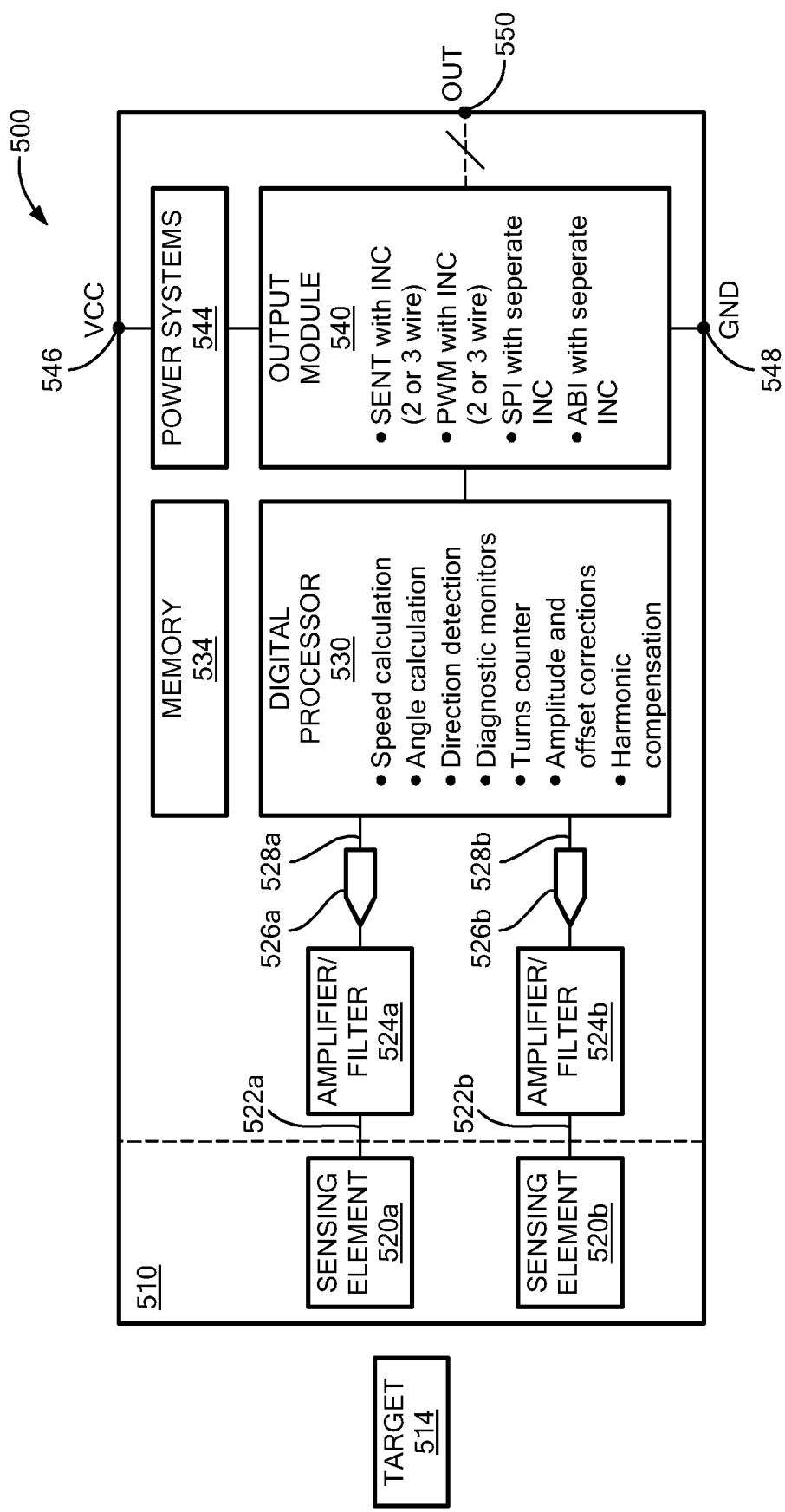
FIG. 5 is a block diagram of an example system to transmit absolute data and incremental data.

Sensor 104a includes one or more sensing elements configured to sense a parameter associated with a target (as shown in FIG. 5). Sensing elements may take various forms depending on the sensor type and application. For example, the sensing elements can include, but are not limited to magnetic field sensing elements, optical detectors, temperature sensors. The target can also take various forms. For example, in the case of a magnetic field sensor 104a, a sensed target can take the form of a ring magnet or a ferromagnetic target (e.g., gear teeth) where the magnetic field sensor is used in combination with a back-biased magnet. The sensed parameter can be motion of the target, such as rotation and/or position of the target, such as an angular position, to name a few examples. For simplicity of explanation, features of the disclosure are described herein in connection with sensor 104a taking the form of an angular position sensor or simply angle sensor.

Sensor 104a further includes a processor coupled to the sensing element and configured to generate a sensed signal indicative of the parameter associated with the target. In the case of a magnetic field sensor for example, the sensed signal can be the output signal of a magnetic field transducer such as a Hall effect or magnetoresistance element.

An output module of the sensor 104a is coupled to receive the sensed signal and configured to transmit absolute data based on the sensed signal. Thus, the absolute data is indicative of the sensed parameter.

The incremental data can be data associated with predetermined changes in the absolute data (i.e., changes of a predetermined increment). For example, in the case of an angle sensor, the incremental data can indicate an incremental change in the sensed angle (e.g., an incremental change of a predetermined number of degrees, or ΔΘ). In one particular example, the absolute data is an angle measurement (e.g., 275°) and the sensor IC 104a sends incremental data each time there is, for example, an incremental change (e.g., a 0.2° change) in the absolute data. In another example, the absolute data is a magnetic field intensity (e.g., 100 Oersted) and the sensor IC 104a sends incremental data each time there is, for example, an incremental change (e.g., a 0.2 Oersted change) in the absolute data.

The absolute data is transmitted on message line 106 at a first rate. The incremental data is transmitted at a second rate that is faster than the first rate at which the absolute data is transmitted. For example, absolute data in the form of SENT messages can be sent on the message line 106 every 128 microseconds while the incremental data sent can be sent every 3 microseconds or even faster. The system 100 allows a faster response time to detect changes in the absolute data than traditional arrangements.

The format of the absolute data can be various unidirectional and/or bidirectional formats, including but not limited to Serial Peripheral Interface (SPI), Single-Edge Nibble Transmission (SENT), I²C, Pulse Width Modulation (PWM), ABI, to name a few. For example, a unidirectional SENT format may be used by the IC 104*a* to transmit absolute data to the ECU 102 on the message line 106. In other examples, a bidirectional format (e.g., a triggered SENT or Manchester format) may be used by the IC 104*a* to transmit data to the ECU 102 on the message line 106 after receiving a request from the ECU 102.

In some embodiments, the incremental data is transmitted on an index line 108 which can be considered a dedicated line for communication of incremental data as is described in connection with FIGS. 4, 4C, and 4D. In some embodiments, the absolute data and the incremental data are transmitted on a shared line as described in connection with FIG. 4A. And in some embodiments, the incremental data is transmitted on a power connection of the IC as described in connection with FIG. 4B. In some embodiments, more than one index line 108 with incremental data can be used for purpose of safety, redundancy, or transients filtering.

It will be appreciated that while features are described herein with respect to a single sensor 104*a*, the described features can be readily extended for use by more than one IC 104*b*-104*n* and/or with more than one ECU 102. For example, in embodiments, a plurality of ICs 104*a*-104*n* can share a message line 106 and can have separate index lines 108 coupled to the ECU 102. In embodiments, the index lines and the message lines associated with a plurality of ICs 104*a*-104*n* are coupled together and to the ECU 102. Communication on shared index and/or message lines can be sequential (i.e., the ICs can take turns transmitting on the shared lines). IC and ECU configurations are described in a co-pending U.S. patent application Ser. No. 16/952,215, entitled "Signaling Between Master and One or More Slave Components to Share Absolute and Incremental Data" and filed on Nov. 19, 2020, the entirety of which is hereby incorporated herein by reference.

Figure 2:
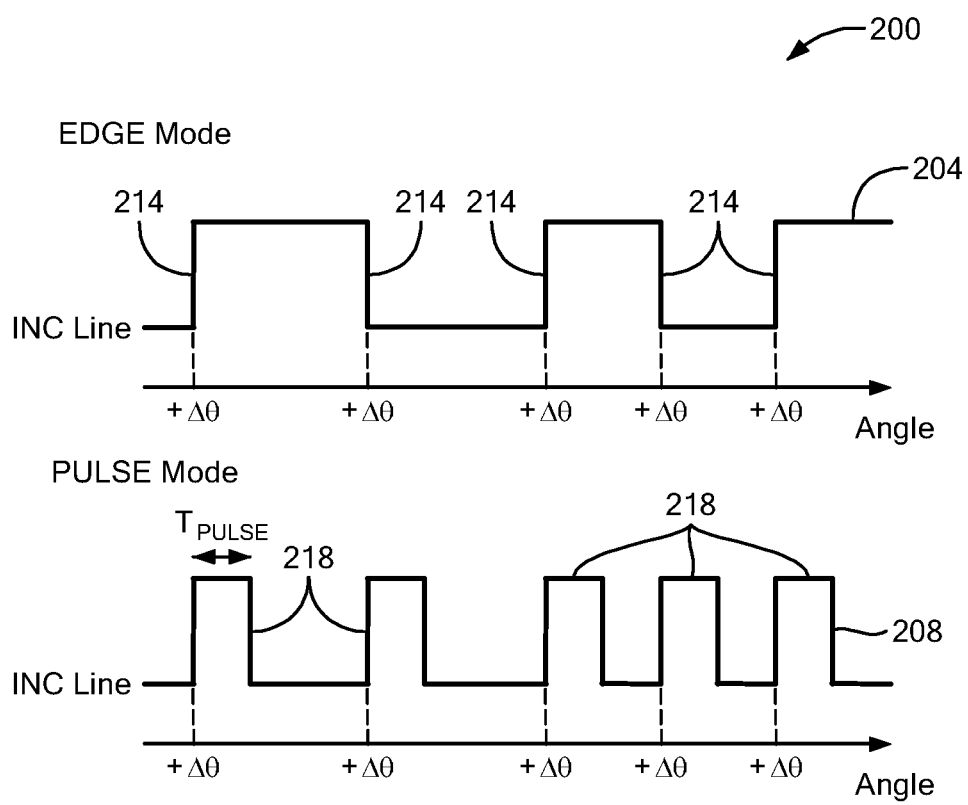
FIG. 2 is a diagram of example incremental data according to a pulse mode and an edge mode.

Referring also to FIG. 2, examples 200 of incremental data 204, 208 are shown. In some embodiments, incremental data 204 can include an edge 214 to indicate that an incremental change has occurred in the absolute data, as can be referred to as edge mode. In other words, in this example, each edge 214 (i.e., transition from one signal level to another) indicates an incremental change (e.g., a positive incremental change in the angular position of the target, +ΔΘ). In the example incremental data 204, each edge (both a rising edge from a low state to a high state and a falling edge from a high state to a low state) indicates a positive incremental change in the absolute data.

Implementation of such edge based incremental data 204 can be achieved by pulling up or pulling down on the index line 108 (FIG. 1) depending on the previous signal level when the detected position has changed by the incremental amount ΔΘ.

In other embodiments, the incremental data 208 can indicate that a change has occurred in the absolute data by transmitting a pulse 218, as can be referred to as pulse mode. In other words, an incremental change in the absolute data can be communicated by a transition in the incremental data from a low state to a high state and back to a low state, as illustrated by pulses 218. Alternatively, an incremental change in the absolute data can be communicated by the incremental data transitioning from a high state to a low state and back to a high state.

In some embodiments, the pulse width of pulses 218 can be selectable, such as by user programming of an EEPROM. The selected pulse width can impact the maximum target speed supported by the incremental data 208 as described below.

The maximum target speed supported by the incremental data is based on the maximum possible frequency for the index line 108 which is dependent on output load and the selected resolution ΔΘ for the incremental data. For example, in the case of edge mode incremental data 204, the maximum target speed can be given by:

$$\text{MAX\_SPEED [electrical RPM]} = 2 \times \text{MAX\_}f_{INC} \text{ [Hz]} \times \Delta\Theta \text{ [degrees]}/6$$

where MAX\_$f_{INC}$ is the maximum possible frequency for the index line 108 which is dependent on output load.

It will be appreciated by those of ordinary skill in the art that the maximum target speed is dependent on the line on which the incremental data is communicated to the ECU. For example, in embodiments in which the incremental data is transmitted on the message line along with the absolute data (FIG. 4A), it is the maximum possible frequency supported by the message line 106 that governs maximum target speed and in embodiments in which the incremental data is transmitted on a power connection (FIG. 4B), it the maximum possible frequency supported by the power connection that governs maximum target speed.

In the case of pulse mode incremental data 208, the maximum target speed can be given by:

$$\text{MAX\_SPEED [electrical RPM]} = 1/(2 \times T_{PULSE} \text{ [s]}) \times \Delta\Theta \text{ [degrees]}/6$$

where $T_{PULSE}$ is the pulse width which, as noted above, can be user selectable or programmable.

Figures 2A, 2B:
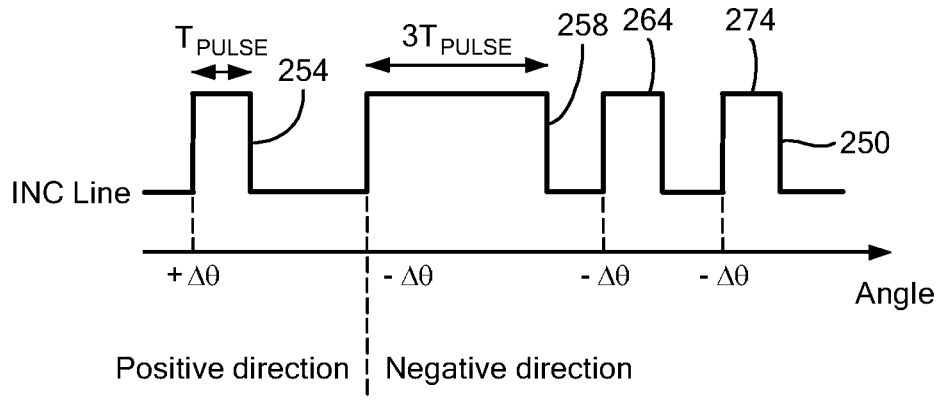
FIG. 2A is a diagram of example pulse mode incremental data to communicate direction.
FIG. 2B is a table illustrating incremental data resolution options.

Referring also to FIG. 2A, in the pulse mode, the sensor IC 104*a* may transmit incremental data 250 in a manner that indicates a change in direction of motion of a target by using a pulse width. For example, a pulse width of $T_{PULSE}$ as shown for pulse 254 may indicate a clockwise direction of target motion while a pulse width of $3T_{PULSE}$ may indicate a change to a counterclockwise direction of target motion. Each pulse 254, 258, 264, 274 can communicate an incremental change in the absolute data; however, when the target is moving in the first (e.g., forward) direction, a communicated incremental change can be a positive change +ΔΘ, whereas when the target is moving in the second (e.g., reverse) direction, a communicated incremental change can be a negative change −ΔΘ.

In embodiments, the size of the increments indicated by the incremental data (i.e., the resolution) can be configurable, adjustable, and/or selectable, such as pre-programming the resolution or by user programming of an EEPROM. For example, the incremental change ΔΘ indicated by the incremental data can take values such as 0.2 degrees, 0.5 degree, and 1.0 degree in case of angular absolute information or for instance values of 1 mm, 2 mm or 5 mm in case of linear displacement absolute information.

FIG. 2B shows a table 280 illustrating example selectable incremental data resolution options. In particular, each selectable incremental data resolution as listed in the first column 282, has a corresponding incremental angle ΔΘ in units of degrees as listed in the second column 284, and a corresponding angular resolution in bits as listed in the third column 286. It will be appreciated by those of ordinary skill in the art that the table of FIG. 2B is illustrative only and the number of selectable resolutions and corresponding increments in angular degrees (or other units for absolute data other than angular position) and bits of resolution can be varied to suit a particular application.

In embodiments, resolution of the incremental data can be dynamically varied or adjusted, such as based on target speed for example. In other words, sensor IC 104a can provide a first resolution of incremental data for target speeds within a first range of speeds and can provide a second, different resolution of incremental data for target speeds within a second range of speeds different than the first range of speeds. In embodiments, the first resolution can be lower than the second resolution and the first range of target speeds can be faster than the second range of target speeds.

Figure 3:
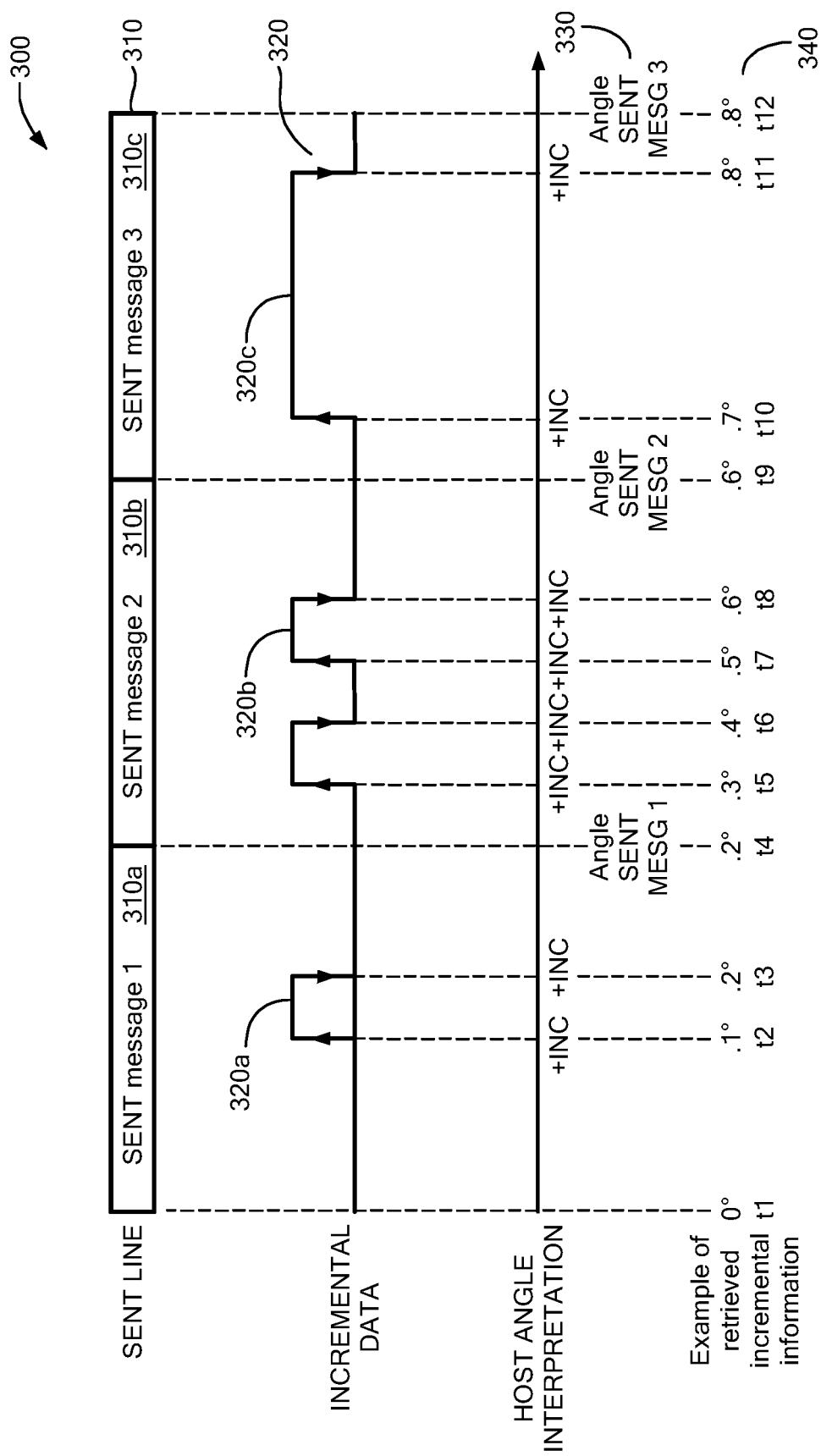
FIG. 3 is a diagram of example absolute data, incremental data, and host interpretation.

Referring also to FIG. 3, a diagram 300 illustrates example absolute data 310, incremental data 320, and host interpretation 330. Absolute data 310 takes the form of a SENT signal including individual SENT messages 310a-310c. For each SENT message 310a-310c, incremental data 320a-320c, respectively, communicates incremental changes (i.e., +INC) in the absolute data, here in an edge mode fashion, in which each edge of incremental data indicates an incremental change in the absolute data.

As noted above, the resolution of the incremental change +INC can be pre-programmed or user programmed. In an example, the first SENT message 310a indicates a starting target angle of 0 degrees and the incremental data 320 communicates incremental changes with a resolution of 0.1 degrees. The SENT messages 310a-310c can have a user specified tick time and message format. In an example in which the incremental data 320 is communicated on an index line 108 (FIG. 1), the voltage on line 108 can be pulled up or pulled down depending on the previous status when the change in target position meets or exceeds the pre-programmed or user-programmed increment.

Also illustrated in FIG. 3 is interpretation 330 of the absolute data 310 and incremental data 320 by the ECU 102 (FIG. 1) and an example of retrieved incremental information 340. Various schemes are possible for synchronizing the incremental data 320 to the absolute data 310. As one example, the incremental data 320 is synchronized to the first SENT message 310a after power-on by a "count up feature", following which the incremental data is free running after this first synchronization. In this example, the host (ECU 102) interprets the absolute data 310 and the incremental data 320 independently.

With this type of an independent synchronization scheme, for example in the case of an angle sensor and edge mode incremental data 320, the ECU 102 counts edges of incremental data 320 during the first SENT message and interprets the resulting edge count as the initial target angle. In this way, the ECU can be considered to "count up" to the angle during this first message duration. For example, during the first SENT message, the incremental data 320 has two edges at times t2 and t3. Thus, by the end of the first SENT message (at time t4), the retrieved incremental information 340 yields a target angle interpretation of 0.2°, as shown. Following such synchronization during the first SENT message 310a, the retrieved incremental information 340 increases by 0.1° each time an edge of incremental data occurs (e.g., at times t5, t6, t7, t8, t10, and t11), as shown.

Another type of synchronization of the incremental data 320 to the absolute data 310 can be accomplished by synchronizing the incremental data to a previous SENT message. In one such example, the incremental data 320 is synchronized with a predetermined point of the previous SENT message (e.g., end of the synchronization nibble). In this synchronization scenario, the incremental data 320 represents an incremental change in the absolute data communicated in the prior SENT message. Consider an example in which a SENT message previous to the illustrated message 310a indicates an absolute target angle of 0 degrees. In this scenario, incremental data 320a occurring during SENT message 310a can indicate an incremental change to the previous SENT message indication of 0 degrees. Thus, each of the incremental data edges at times t2 and t3 can indicate an incremental change of 0.1 degrees to the 0 degrees communicated in the previous SENT message, so that by the end of the first SENT message (at time t4), the retrieved incremental information 340 yields a target angle interpretation of 0.2° (i.e., computed as 0° from the previous SENT message +0.1° communicated by incremental data edge t2+0.1° communicated by incremental data edge t3). Following such synchronization during the first SENT message 310a, the retrieved incremental information 340 increases by 0.1° each time an edge of incremental data occurs (e.g., at times t5, t6, t7, t8, t10, and t11), as shown.

It will be appreciated that in embodiments in which the incremental data 320 is communicated on a separate index line 108 (FIG. 1), communication of incremental data can provide a safety feature whereby the target angle as communicated via the index line 108 can be compared to the target angle data as communicated by the SENT messages 310a-310c on the message line 106. Thus, even if the message line 106 were to fail, incremental data can still be communicated via the index line 108 and vice versa, if there is a failure of the index line 108, absolute data can still be communicated via the message line 106.

Figure 4:
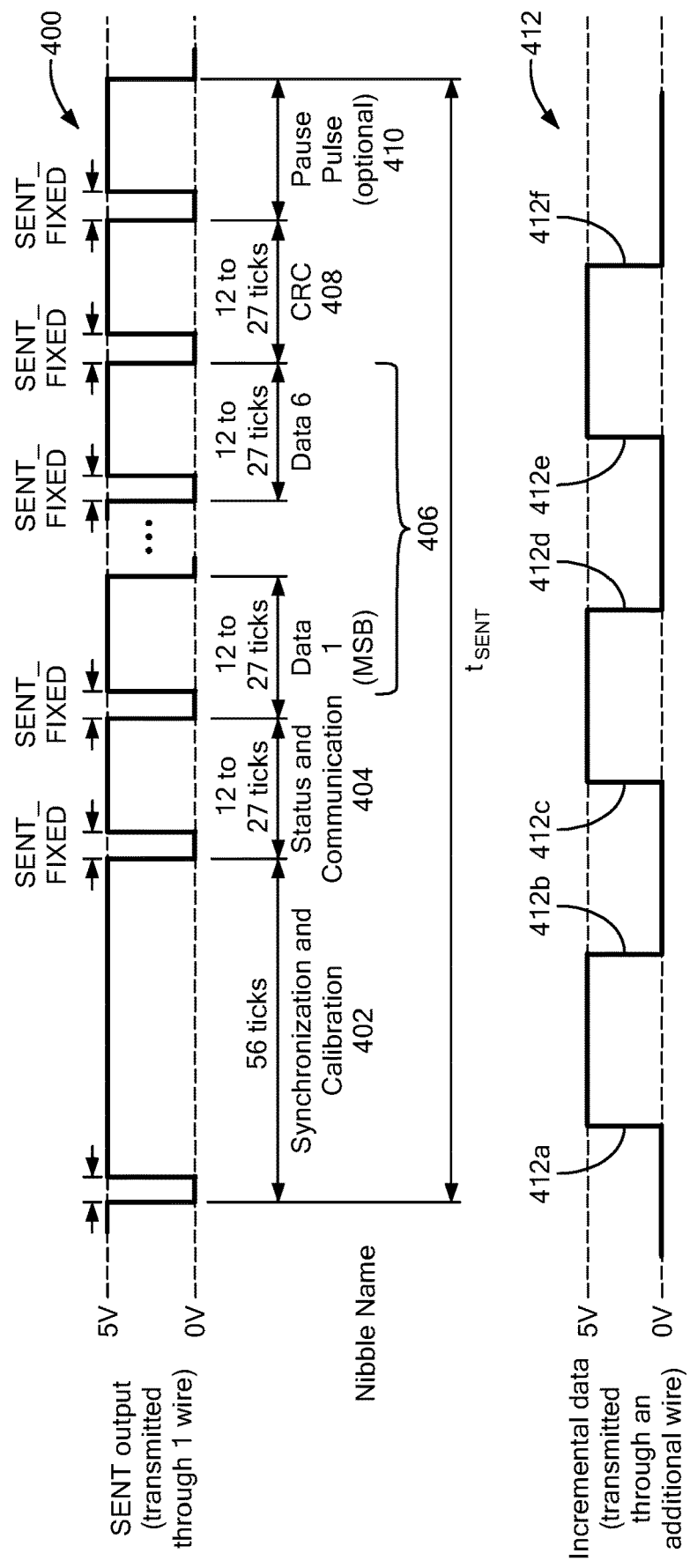
FIG. 4 is a diagram of example absolute data in the form of a SENT message and incremental data transmitted on a dedicated index line.

Referring to FIG. 4, example absolute data 400 in the form of a SENT message is shown along with incremental data 412 transmitted on a separate, dedicated line, such as index line 108 (FIG. 1). The SENT message 400 can include a sequence of pulses transmitted by the sensor IC 104a and in the example angle sensor, the target angle can be converted into the pulses with data encoded as falling to falling edge periods. SENT message 400 can include a Synchronization and Calibration portion 402, a Status and Serial Communication portion 404, a Data portion 406, and a Checksum (or cyclic redundancy check, CRC) portion 408. A "tick" refers to the nominal clock signal period and a "nibble" is 4 bits. Each nibble has a specified time for low and high state. The low state duration is by default 5 ticks and the high state duration is dictated by the information value of the nibble. The Synchronization and Calibration portion 402 identifies the start of the SENT message 400 and has a pulse duration of 56 ticks. Status and Serial Communication portion 404 is used to inform the ECU 102 of the sensor status or features (such as part numbers or error code information) and has a duration of between 12 and 27 ticks to provide 4 bits. Data portion 406 includes up to six nibbles of data, with each nibble containing 4 bits with values ranging from 0 to 15. Thus, each data nibble has a pulse duration from 12 to 27 ticks. The number of data nibbles will be fixed for each application but can vary between applications. In order to transmit two 12 bit values, 6 data nibbles are communicated, as shown. The SENT signal 400 includes an optional pause portion 410 that can be used to permit bidirectional communication. In general, the pause portion 410 corresponds to a period of inactivity on the sensor output, when the absolute data on the message line 106 (FIG. 1) is inactive. The pause portion 410 is sometimes used to prolong the SENT signal to a constant length if desired. The user can program a particular desired frame rate.

Incremental data 412 can be edge based or pulse based. In the case of edge based incremental data, each edge 412a-412f can communicate an incremental change in the absolute data presented by SENT message 400, such as each edge representing an increase of 0.1 degrees in the measured target angle. In the case of pulse based incremental data, each of the three illustrated pulses (i.e., a first pulse bounded by edges 412a, 412b, a second pulse bounded by edges 412c, 412d, and a third pulse bounded by edges 412e, 412D can communicate an incremental change in the absolute data 400.

Figure 4A:
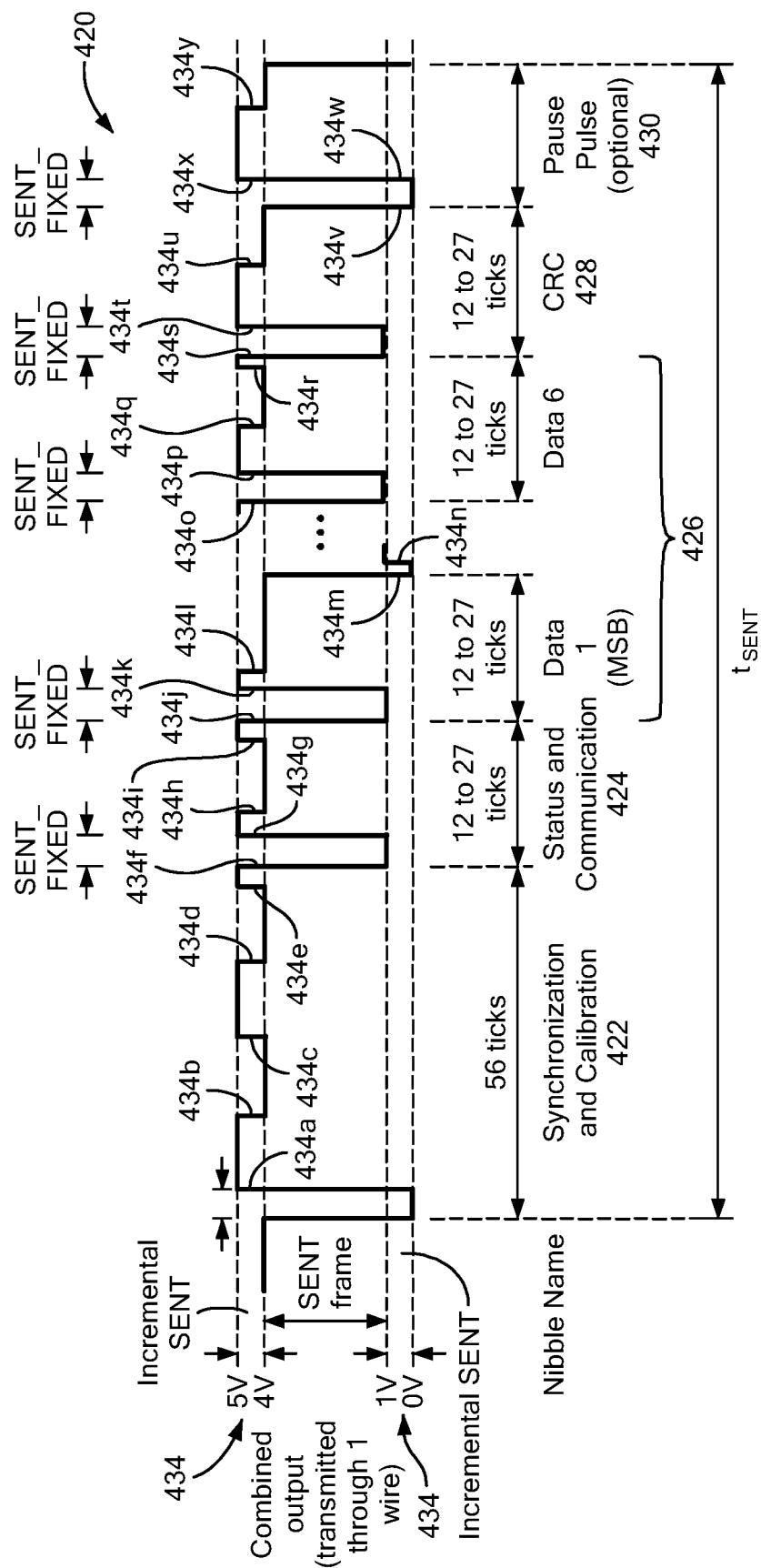
FIG. 4A is a diagram of example absolute data in the form of a SENT message and incremental data transmitted on the same message line.

Referring to FIG. 4A, in some embodiments, absolute data and incremental data are transmitted on a shared line as a combined, or composite signal 420 in which different signal levels can be used to communicate the absolute data and the incremental data. For example, absolute data can be transmitted by a signal level range of between 1V to 4V and incremental data can be transmitted by a different signal level range, such as between 0V to 1V when the SENT signal is low and between 4V to 5V when the SENT signal is high. The absolute data in the form of a SENT signal can include a Synchronization and Calibration portion 422, a Status and Serial Communication portion 424, a Data portion 426, and a CRC portion 428, and an optional pause portion 430.

The incremental data 434 of the combined signal 420 can be edge based in which case each of edges 434a-434y represents and communicates an incremental change in the absolute data. Alternatively, the incremental data 434 can be pulse based in which case each pulse as represented by adjacent edge pairs (e.g., a pulse represented by edge pairs 434a, 434b and a pulse represented by edge pairs 434c, 434d) represents an incremental change in the absolute data.

An ECU 102 (FIG. 1) receiving composite absolute and incremental data signal 420 can decode the absolute data using a threshold level of approximately 2.5V. The incremental data 434 can be decoded using additional thresholds of 0.5V and 4.5V, for example.

Transmitting absolute and incremental data on a single line 420 is particularly advantageous in applications requiring fewer wires, or connections while still communicating SENT and faster incremental information. For example, in this embodiment, the sensor IC 104a can include only three connections; namely a power, or VCC connection, a ground connection, and a single output connection.

Figure 4B:
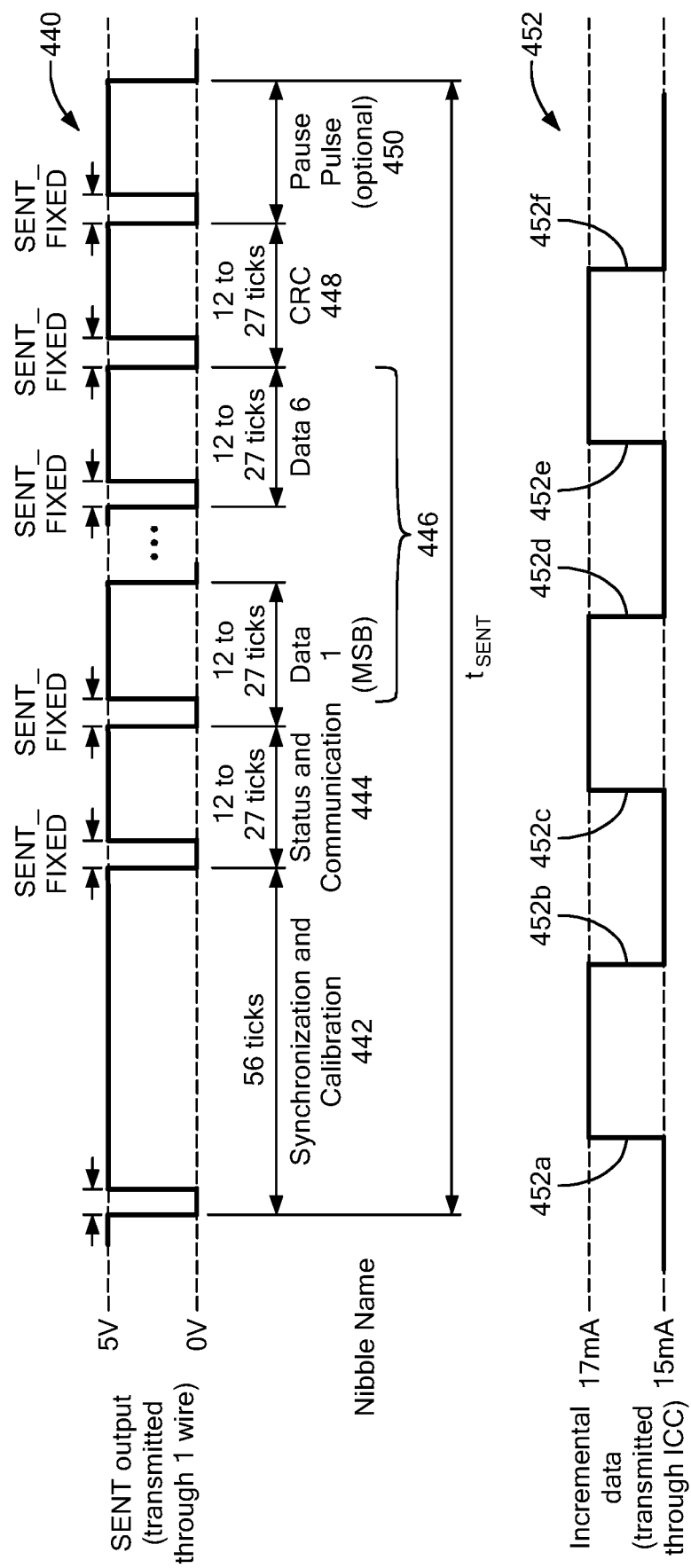
FIG. 4B is a diagram of example absolute data in the form of a SENT message and incremental data transmitted on a power connection.

Referring to FIG. 4B, in some embodiments, the incremental data can be transmitted on a power connection of the sensor IC 104a. In this example, absolute data 440 in the form of a SENT signal can include a Synchronization and Calibration portion 442, a Status and Serial Communication portion 444, a Data portion 446, a CRC portion 448, and an optional pause portion 450.

The incremental data 452 can take the form of current pulses transmitted on the VCC and/or ground connections of the IC 104a (FIG. 1). In one example embodiment, data is communicated by 2 mA current pulses (i.e., ICC) on the power connection VCC.

In an edge based incremental data example, each edge 452a-452f of the incremental data 452 can communicate an incremental change in the absolute data. Alternatively, in a pulse based incremental data example, each pulse as represented by adjacent edge pairs (e.g., a pulse represented by edge pairs 452a, 452b and a pulse represented by edge pairs 452c, 452d) represents an incremental change in the absolute data.

An ECU 102 (FIG. 1) receiving incremental data 452 can decode the incremental data using current comparator circuitry and techniques.

Transmitting incremental data 452 on a power connection (e.g., as current pulses ICC) is advantageous in applications requiring fewer wires, or connections while still communicating SENT and faster incremental information. For example, in this embodiment, the IC 104a can include only three connections; namely a power, or VCC connection, a ground connection, and an output connection on which the absolute data is transmitted.

Figure 4C:
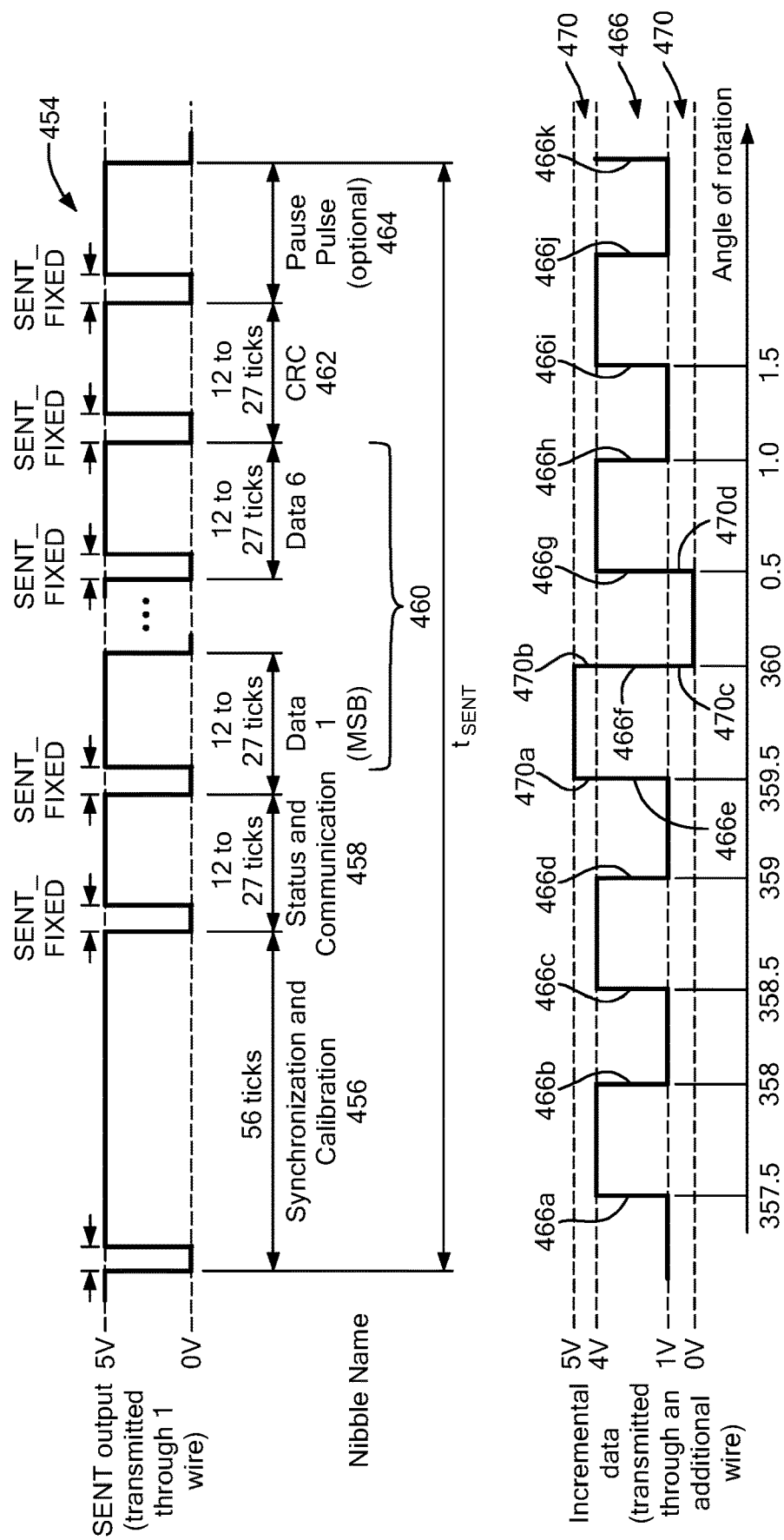
FIG. 4C is a diagram of example absolute data in the form of a SENT message and incremental data transmitted on a dedicated index line and including additional data communicated by signal level.

Referring also to FIG. 4C, example absolute data 454 in the form of a SENT message is shown along with incremental data 466 transmitted on a separate, dedicated index line, such as index line 108 (FIG. 1) and including additional absolute data 470 communicated by signal level. The SENT message 454 can include a Synchronization and Calibration portion 456, a Status and Serial Communication portion 458, a Data portion 460, a CRC portion 462, and an optional pause portion 464.

The incremental data 466 can be edge mode data, such that each edge 466a-466k can communicate an incremental change in the absolute data 454, such as the illustrated incremental change of 0.5 degrees of rotation of the sensed target.

The additional absolute information 470 transmitted with the incremental data 466 can communicate various data. Examples include synchronization data, such as absolute angular position of the sensed target at predetermined angular positions, such as every 360° or every 120°, diagnostic information, or other additional information.

The additional absolute information 470 transmitted with the incremental data 466 can be communicated in various ways, such as by signal level excursions beyond the nominal level of the incremental data 466, as shown. For example, incremental data 466 can be transmitted by a signal level range of between 1V to 4V and additional absolute date 470 can be transmitted by a different signal level range, such as between 0V to 1V when the incremental data 466 is low and between 4V to 5V when the incremental data 466 is high.

In the case of the additional data being a predetermined angular position of the sensed target, an excursion of the additional data 470 from 5V to 0V (as labeled 470b, 470c) can indicate a target position of 360° for example. It will be appreciated that an excursion of the additional data 470 from 0V to 5V could alternatively be used to indicate the predetermined target position of 360° or other additional information intended to be communicated with the incremental data 466.

Figure 4D:
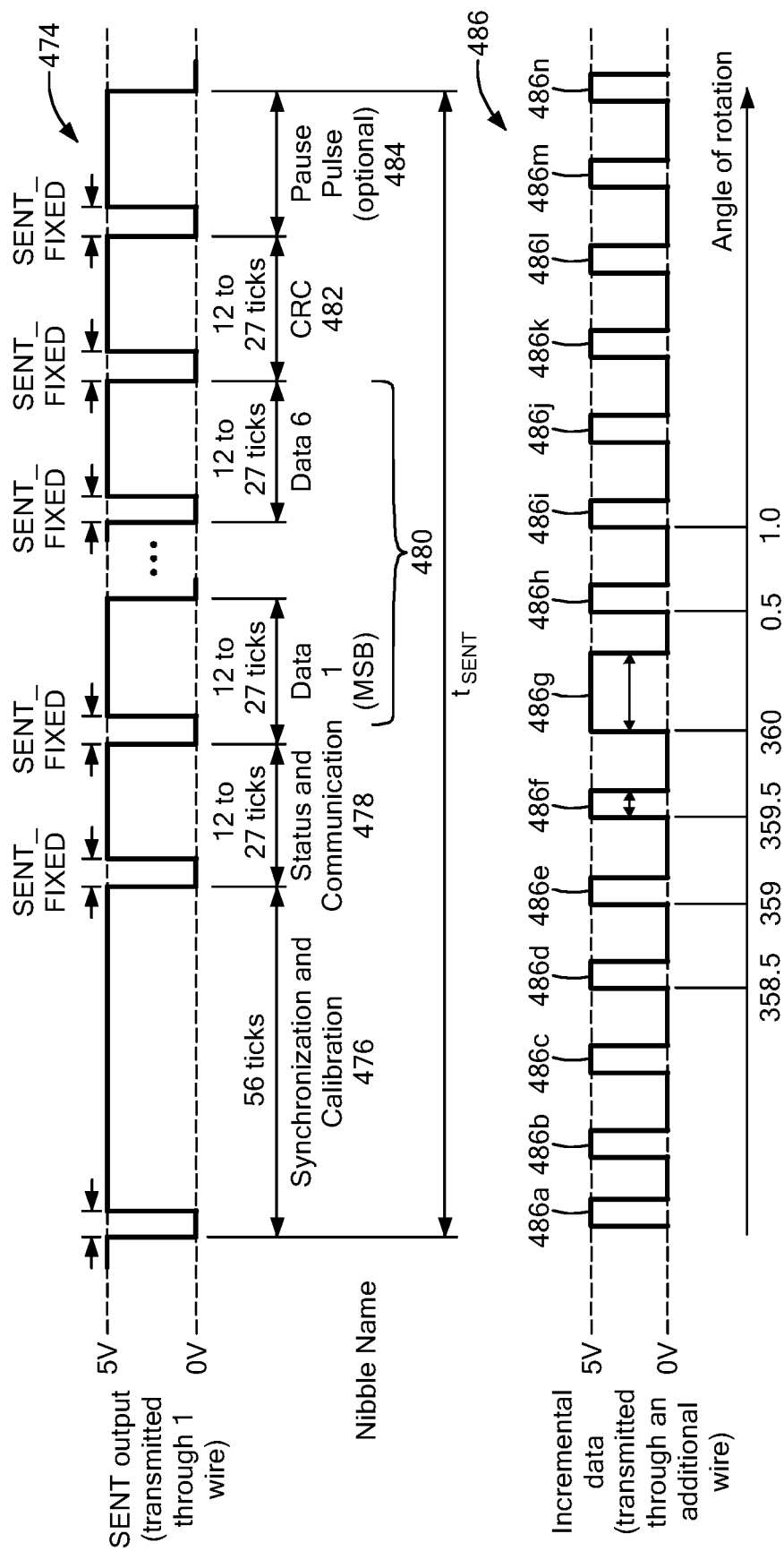
FIG. 4D is a diagram of example absolute data in the form of a SENT message and incremental data transmitted on a dedicated index line and including additional data communicated by pulse width.

Referring also to FIG. 4D, example absolute data 474 in the form of a SENT message is shown along with incremental data 486 transmitted on a separate, dedicated index line, such as index line 108 (FIG. 1) and including additional absolute data communicated by pulse width. The SENT signal can include a Synchronization and Calibration portion 476, a Status and Serial Communication portion 478, a Data portion 480, a CRC portion 482, and an optional pause portion 484.

The incremental data 486 can be pulse mode data, such that each pulse 486a-486n can communicate an incremental change in the absolute data 474, such as the illustrated incremental change of 0.5 degrees of rotation of the sensed target.

The additional absolute information transmitted with the incremental data 486 can communicate various data. Examples include synchronization data, such as absolute angular position of the sensed target at predetermined angular positions, such as every 360° or every 120°, diagnostic information, or other additional information.

The additional absolute information transmitted with the incremental data 486 is communicated by pulse width. For example, incremental data pulses that communicate an incremental change in the absolute data 474 can have a first nominal width as shown for pulses 486a-486f and 486h-486n and the additional absolute information can have a second, different pulse width as shown for wider pulse 486g. It will be appreciated that while the second pulse width is shown to be larger than the first, nominal pulse width, the alternative is possible with the first, nominal pulse width being the larger pulse width.

In the example case of the additional absolute data being a predetermined angular position of the sensed target, occurrence of a pulse 486g having the second width can indicate a target position of 360° for example. It will be appreciated that while occurrence of a pulse 486g having the second width is illustrated as communicating a predetermined absolute angular target position of 360°, in other embodiments, a pulse having the second width can communicate diagnostic or other additional information.

Referring also to FIG. 5, an example system 500 to transmit absolute data and incremental data includes a sensor IC 510 proximate to a target 514. The sensor IC 510 can be the same as or similar to IC 104a of FIG. 1 and can implement one or more of the above-described schemes for transmitting absolute and incremental data between the IC and a control unit (not shown in FIG. 5, but which control unit can be the same as or similar to ECU 102 of FIG. 1).

One or more sensing elements 520a, 520b is configured to sense a parameter associated with the target 514. For example, each of sensing elements 520a, 520b can sense a position and/or movement of target 514. A sensed signal 522a, 522b generated sensing elements 520a, 520b can be processed by respective front-end circuitry including an amplifier and filter 524a, 524b and an analog-to-digital converter (ADC) 526a, 526b, respectively. Each signal path from sensing element to ADC can be referred to as a channel and provides a respective converted signal 528a, 528b. Use of multiple channels in the sensor IC 510 can be used to determine a direction of motion (e.g., rotation) of target 514.

Sensing elements 520a, 520b can take various forms and can include more or fewer than the illustrated two sensing elements in various configurations such as bridge configurations. For example, in applications in which the sensor 510 is a magnetic field sensor, sensing elements 520a, 520b can take the form of one or more of a giant magnetoresistor (GMR), a tunnel magnetoresistor (TMR), a Hall effect element, a pickup coil, and/or any other suitable type of magnetic field sensing element. Sensing element 520a may have a first axis of maximum sensitivity and sensing element 520b may have a second axis of maximum sensitivity that is perpendicular to the first axis of maximum sensitivity. As a result of this arrangement, a signal generated by sensing element 520a may have a sinusoidal waveform and a signal generated by sensing element 520b may have a cosinusiodal waveform, rendering the resulting signals 528a, 528b responsive to orthogonal field components (i.e., in quadrature).

Memory 534 can be configured to store various values for use during sensor operation, some of which can be user-programmable. In embodiments, memory 534 can take the form of a non-volatile memory, for example, an EEPROM.

A digital processor 530 can be coupled to receive respective processed and converted signals 528a, 528b and can be configured to perform various processing, depending on the type of sensor IC 510 and application. For example, amplitude and offset compensation can be performed on converted signals 528a, 528b in order to implement gain and offset adjustments to compensate for gain mismatches between the processing channels and offsets introduced by the sensing elements 520a, 520b, respectively. The amplitude and offset corrections can also adjust gain and offset based on temperature variations and other factors. To this end, sensor 510 can include a temperature sensor (not shown). Adjusting the gain of signals 528a, 528b may include multiplying the respective signal by a gain adjustment coefficient as may be stored in memory 534 and offsetting the signals 528a, 528b may including adding an offset adjustment coefficient as may be stored in memory to the respective signal. It will be understood that the present disclosure is not limited to any specific methodology for offset and/or a gain adjustment.

Harmonic compensation can be implemented by processor 530 in order to compensate for error in calculated signals (e.g., error in a calculated angle signal). For example, error can be expressed in its harmonic terms after performing a Fourier transform. Compensation for harmonic errors can be performed by generating coefficients (e.g., coefficients representing the phase and magnitude of each harmonic error term) that can be stored in memory 534 and selectively applied to the calculated signal. For example, in a manufacturing setting, data from a single rotation of the target 514 that is measured by a proximate angle sensor 510 can be stored and used to generate the harmonic compensation coefficients by performing a Fast Fourier Transform (FFT) on the collected data. In this way, the error can be recreated and used to compensate the calculated signal (e.g., by applying the recreated harmonic error terms to the computed angle). It will be understood that the present disclosure is not limited to any specific methodology for harmonic compensation.

Processor 530 can perform a speed calculation whereby a speed of motion (e.g., rotation) of the target 514 can be determined, such as by comparing one or both converted signals 528a, 528b to a threshold signal. Direction calculation can be performed in various ways. For example, a direction of rotation of the target 514 can be determined by the phase relationship between the converted signals 528a, 528b whereby a first direction of rotation can correspond to signal 528a leading signal 528b and a second, opposite direction of rotation can correspond to signal 528a lagging signal 528b. It will be understood that the present disclosure is not limited to any specific methodology for target speed and/or direction calculation.

An angle of target 514 also can be determined in various ways, for example, by performing CORDIC processing on converted signals 528a, 528b. It will be understood that the present disclosure is not limited to any specific methodology for angle calculation.

Additional processing by processor 530 can include maintaining a turns count register to indicate a number of rotations experienced by the target 514. To this end, turns counter logic can be responsive to the speed signal and to the direction signal in order to determine when to increment or decrement the turns counter. The angular change for which the register is incremented/decremented can be programmable. For example, in the context of a vehicular electronic steering system, memory 534 can be continuously updated in order to track and update the position of a steering wheel. Circuitry used in some electronic steering systems includes a so-called "turns count register" that is used to keep count of a number of wheel turns beyond 360 degrees e.g. the number of turns made by a gear tooth.

Processor 530 can implement diagnostic monitoring in order to detect faults or errors for reporting to ECU 102 and/or for initiating other appropriate action for example. A fault may include one or more of: a supply voltage under voltage condition, a voltage check failure, a supply voltage over voltage condition, a temperature sensor error, a magnet sense high, a saturation current, a magnet sense low, a signal path mismatch condition, a memory error condition, an error of the absolute data, a slew rate warning, oscillator frequency error, to name a few.

Processor 530 can implement dynamic incremental data resolution adjustment, for example based on target speed as explained above. In other words, sensor IC 510 can provide a first resolution of incremental data for target speeds within a first range of speeds and can provide a second, different resolution of incremental data for target speeds within a second range of speeds different than the first range of speeds. It will be appreciated that the calculated target speed can be used for this purpose.

Processor 530 can implement hysteresis on the incremental data in order to avoid inaccurate or false incremental data transitions (i.e., edges or pulses). For example, hysteresis on the incremental data can avoid falsely indicating an incremental change in the absolute data when such an incremental change has not occurred and/or can avoid falsely indicating a target motion direction change.

In embodiments, errors are communicated via the incremental data. Errors may additionally or alternatively be communicated as part of the absolute data.

Processor 530 can implement a "count up" feature with which the incremental data catches up with the absolute data first detected upon power up of the sensor 510 and output on the absolute data message line 106 (FIG. 1). The count up feature is advantageous in embodiments in which the absolute data is not reset to a predetermined value such as zero after a power on reset. In such situations in which it is not possible to ensure an initial absolute data value, the count-up feature can synchronize the incremental data with the actual data using a slew rate feature. After power-up, using slew rate, the incremental data (i.e., index line 108 of FIG. 1) can inject fast "fake" pulses toward actual data until the incremental data matches the absolute data. For example, in the case of angle measurements, the incremental data can constantly emit "fake" pulses in the closest direction towards the current angle position (e.g., if the current angle position is 270°, the incremental data will increment in a direction towards this value effectively counting down from 360°). An example of this feature is illustrated by retrieved incremental data 340 during the first SENT frame in FIG. 3.

Output module 540 can be coupled to receive one or more signals from digital processor 530 and generate one or more sensor output signals 550 to communicate the sensed parameter in the form of absolute data and incremental data to external systems, such as ECU 102 (FIG. 1). The sensor output signals 550 may optionally include additional information such as direction and diagnostics for example.

Sensor output signals 550 can take various formats such as SENT, PWM, SPI, and ABI to name a few. The sensor output signal format can be programmable.

SENT and PWM output formats can have the incremental data provided on the same signal line as the absolute data (e.g., as shown in FIG. 4A) and can utilize a three wire output configuration in which the absolute data and the incremental data can be provided together on a dedicated output signal line or can utilize a two wire configuration in which the absolute and incremental data can be provided together on a power and/or ground connection 546, 548 as may be coupled to power systems 544 including regulation circuitry. For example, such two wire transmission can take the form of current pulses on the power and/or ground connection 546, 548 as shown in FIG. 4B. SPI and ABI output signal formats can be communicated on signal lines with incremental data on a separate output signal line than the absolute data. It will be appreciated by those of ordinary skill in the art that other output signal formats and connection configurations are possible to suit application requirements.

In an example embodiment, the sensor output signal 550 is a PWM signal having a duty cycle proportional to the target angle. The PWM frequency and falling edge time can be programmable in memory 534.

In this example, the PWM output signal 550 can include an indication of a detected error and can do so in various ways. For example, an error can be communicated by changing the PWM signal to a high impedance signal, by decreasing a frequency of the PWM signal, or by setting a duty cycle of the PWM signal to a predetermined duty cycle. Incremental data provided on a separate signal line from the absolute PWM signal can additionally provide an indication of the detected error and can do so in the same manner as the error is indicated in the PWM signal; namely by changing the signal to a high impedance signal, by decreasing a frequency of the signal, or by setting a duty cycle of the signal to a predetermined duty cycle as examples. In this way, the incremental data replicates the error indication provided in the PWM signal.

In some embodiments in which the incremental data communicates a direction of movement of the target 514, a detected error can be communicated in a different fashion than how direction is communicated. For example, in embodiments in which target direction is indicated by pulse width (e.g., as shown in FIG. 2A), detection of an error can be communicated by a change of a signal level of the incremental data. Alternatively, in embodiments in which target direction is indicated by different incremental data signal levels, presence of an error can be communicated by different pulse widths of the incremental data.

While the sensor 510 may be provided in the illustrated form of an IC with an analog front end portion and a digital portion, it will be appreciated that the particular delineation of which circuit functions are implemented in an analog fashion or with digital circuitry and signals can be varied. Further, some of the illustrated circuit functions can be implemented on an interface IC and other circuitry and functionality can be implemented on separate circuits (e.g., additional substrates within the same integrated circuit package, or additional integrated circuit packages, and/or on circuit boards).

Figure 6:
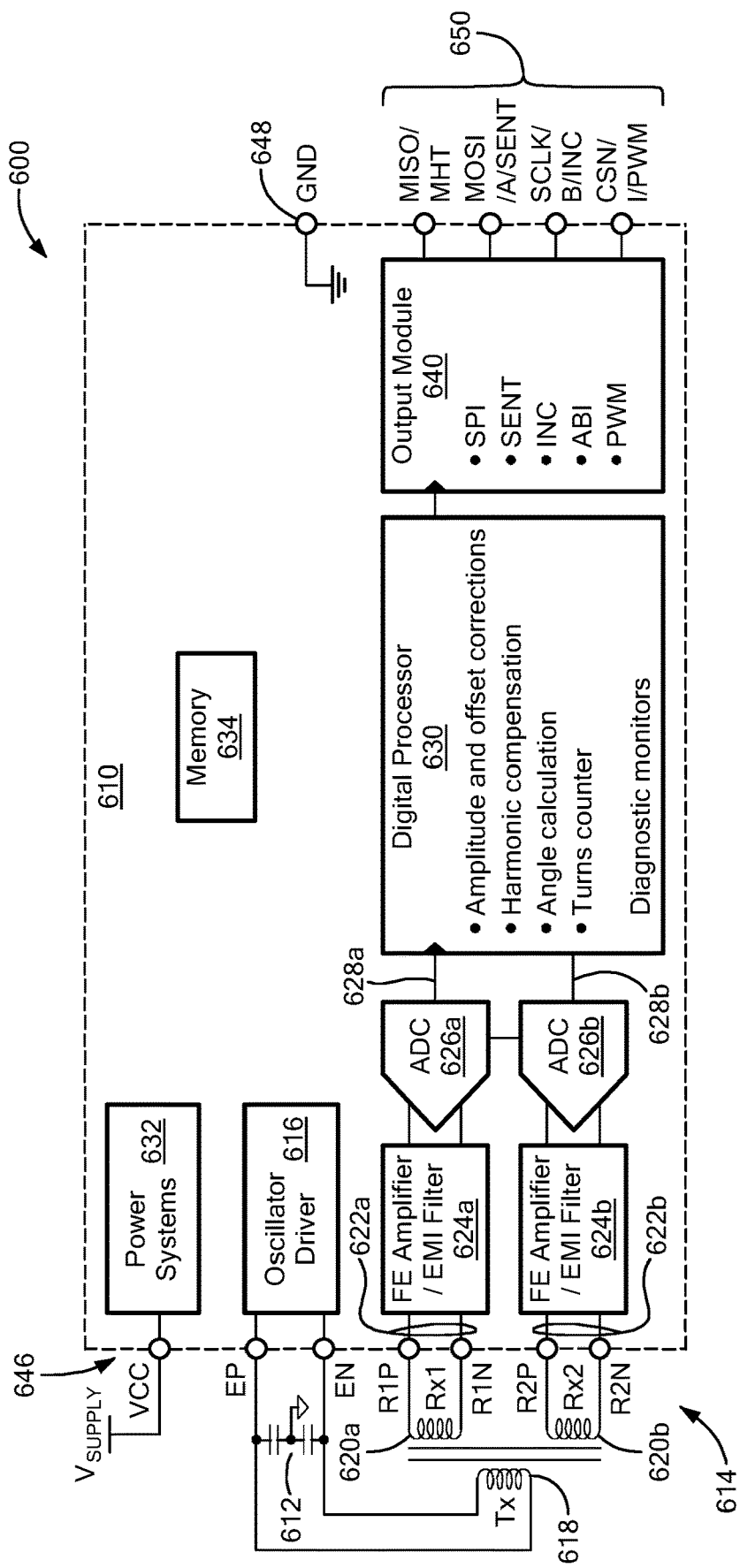
FIG. 6 is a block diagram of another example system to transmit absolute data and incremental data.

Referring to FIG. 6, a sensor system 600 including an inductive position sensor interface IC 610 can be the same as or similar to IC 104a of FIG. 1 and/or IC 510 of FIG. 5 and can implement one or more of the above-described schemes for transmitting absolute and incremental data between the IC 610 and a control unit (not shown in FIG. 6, but which control unit can be the same as or similar to ECU 102 of FIG. 1).

System 600 includes an oscillator 612, a primary coil 618, two secondary coils 620a, 620b, and the interface IC 610. Interface circuit 610 generates an oscillation signal for coupling to primary coil 618 and is coupled to receive secondary signals 622a, 622b from secondary coils 620a, 620b, respectively, as shown. Secondary coils 620a, 620b are electromagnetically coupled to the primary coil 618 and mechanically coupled to a target 614 such that movement of the target causes position information to be encoded in the secondary signals 622a, 622b from coils 620a, 620b by amplitude modulation. In other words, the electromagnetic coupling between the primary coil 618 and secondary coils 620a, 620b is a function of the target position. In an example embodiment, the target 614 is a metallic, non-ferromagnetic object and the primary coil 618 induces eddy currents in the target, which eddy currents, in turn induce a signal in the secondary coils 620a, 620b. As the target 614 moves (e.g., rotates), the coupling between the primary winding 618 and the secondary windings 620a, 620b changes, so as to thereby encode target position information by way of amplitude modulation of the secondary signals 622a, 622b. It will be appreciated that various mechanical configurations for the target 614 and pickup coils 620a, 620b are possible.

The oscillator 612 may take the form of the illustrated resonant circuit (e.g., an LC tank circuit including capacitors and primary coil 618) or other oscillation circuits. Secondary windings 620a, 620b can be designed to have a predetermined phase relationship with respect to each other in order to suit a particular application. In the example embodiment, secondary windings 620a, 620b are designed to generate respective secondary signals in quadrature (i.e., having a nominal ninety-degree phase shift with respect to each other). With this arrangement, the system 600 can generate quadrature sine and cosine output signals that can be used to determine target speed, direction, and/or angle.

Interface IC 610 can include two signal paths, or channels (e.g., an analog, digital or mixed signal path) each coupled to receive a secondary signal 622a, 622b from a respective secondary winding 620a, 620b. Each signal path can include a front end amplifier and EMI filter 624a, 624b and an analog-to-digital converter (ADC) 626a, 626b, as shown. ADCs 626a, 626b can be configured to sample the respective secondary signal (e.g., by integration over sample periods) and convert the integrated signal into a respective digital signal 628a, 628b.

A processor 630 is coupled to receive digital signals 628a, 628b and is configured to calculate an angle and/or speed of motion (e.g., rotation) of the target 614. In embodiments, target angle can be computed using a CORDIC method and target speed can be computed as the derivative of target angle. For example, using consecutive angle values in time, speed is proportional to (angle_1−angle_0)/delta_time].

Processor 630 may implement various signal conditioning and compensation of possible errors due to coils-target alignments and system design. For example, amplitude and offset adjustment may be provided. In general, signal amplitudes will be affected by the current flowing through the primary coil 618 and the distance between the coil and the target. Temperature may also affect signal amplitudes and offsets. Thus, processor 630 can be coupled to receive temperature information from a temperature sensor (not shown) and can operate to automatically track and compensate signal amplitudes and offsets. Harmonic compensation can be performed using correction parameters stored in EEPROM 634 in order to thereby remove undesirable harmonics that could adversely affect position sensing.

IC output signals 650 can be provided in one or more of various signal formats for coupling to external circuits and systems such as an ECU (not shown). Example output signal formats include PWM, SENT, ABI, or SPI to name a few. For example, IC 610 can include four output connections 650 usable for the various output formats as shown. For example, according to a SPI output signal format, output connections 650 can include a MISO (Master In Slave Out) line, a MOSI (Master OUT Slave IN) line, a SCLK (Serial Clock) line, and a CSN (Chip Slave select) line. In an ABI output signal mode, active output connections 650 can include A, B, and I signal lines. In a SENT output signal mode, active output connections 650 can include a SENT line with incremental data communicated on the same line as the absolute SENT data or else on a separate dedicated incremental line. And in a PWM mode, active output connections 650 can include a PWM line with incremental data communicated on the same line as the absolute PWM signal or else on a separate dedicated line.

The selection of interface output signal type (i.e., output mode) can be based on user-programmable parameters stored in EEPROM 634. It will be appreciated that other output signal information such as speed and direction and other output signal formats are possible.

Interface 610 can be provided in the form of an integrated circuit (IC) including one or more semiconductor die and can receive power $V_{SUPPLY}$ 646 for coupling to an on-chip regulator 632 and can have a ground connection 648. EEPROM 634 can store operating values and parameters, such as output signal format, gain and offset correction coefficients, and harmonic correction parameters as examples.

Having described preferred embodiments, which serve to illustrate various concepts, structures and techniques, which are the subject of this disclosure, it will now become apparent to those of ordinary skill in the art that other embodiments incorporating these concepts, structures and techniques may be used.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A sensor integrated circuit (IC), comprising:
   a sensing element configured to sense a parameter associated with a target;
   a processor coupled to the sensing element and configured to generate a sensed signal indicative of the parameter associated with the target; and
   an output module coupled to receive the sensed signal and configured to:
   transmit absolute data on a message line at a first rate; and
   transmit incremental data on one or more index lines at a second rate, wherein the second rate is faster than the first rate,
   wherein the incremental data comprises data associated with changes in the absolute data and wherein an edge or a pulse is used to indicate an incremental change has occurred in the absolute data.

2. The sensor IC of claim 1, wherein the incremental data comprises an indication of an error.

3. The sensor IC of claim 2, wherein the absolute data comprises a Pulse Width Modulation (PWM) signal.

4. The sensor IC of claim 3, wherein the PWM signal comprises an indication of an error.

5. The sensor IC of claim 4, wherein the error indication by the PWM signal comprises one or more of changing the PWM signal to a high impedance signal, decreasing a frequency of the PWM signal, and setting a duty cycle of the PWM signal to a predetermined duty cycle.

6. The sensor IC of claim 5, wherein the error indication by the incremental data comprises replicating the error indication by the PWM signal.

7. The sensor IC of claim 2, wherein the sensed parameter associated with the target is a position of the target, the absolute data is the position of the target, and the incremental data is a change in the position of the target.

8. The sensor IC of claim 7, wherein the incremental data comprises an indication of a direction of movement of the target and wherein a first direction is indicated by a first incremental data pulse width and a second direction is indicated by a second incremental data pulse width and wherein presence of an error comprises a change of a signal level of the incremental data.

9. The sensor IC of claim 7, wherein the incremental data comprises an indication of a direction of movement of the target and wherein a first direction is indicated by a first incremental data signal level and a second direction is indicated by a second incremental data signal level and wherein presence of an error comprises a pulse width of the incremental data.

10. The sensor IC of claim 1, wherein the sensor IC comprises a hysteresis block configured to provide hysteresis to the index line.

11. The sensor IC of claim 1, wherein upon start up of the sensor IC, the absolute data has an initial value and wherein the incremental data has an initial value corresponding to the initial value of the absolute data.

12. The sensor IC of claim 1, wherein a resolution of the incremental change is adjustable.

13. The sensor IC of claim 12, wherein the resolution of the incremental change is user-programmable.

14. The sensor IC of claim 12, wherein the sensed parameter associated with the target is a position of the target, the absolute data is the position of a target, the incremental data is a change in the position of the target, and the resolution of the incremental change is dynamically varied based on a speed of movement of the target.

15. The sensor IC of claim 1, wherein the sensor IC is coupled to an electronic control unit (ECU) for transmission of the absolute data and the incremental data.

16. The sensor IC of claim 1, wherein the sensing element comprises a transmitting coil and a receiving coil.

17. The sensor IC of claim 1, wherein the sensing element comprises a magnetic field transducer comprising one or more of a Hall effect element and a magnetoresistance element.

18. A sensor integrated circuit (IC), comprising:
a sensing element configured to sense a parameter associated with a target;
a processor coupled to the sensing element and configured to generate a sensed signal indicative of the parameter associated with the target; and
an output module coupled to receive the sensed signal and configured to:
transmit absolute data on a message line at a first rate; and
transmit incremental data on one or more index lines at a second rate, wherein the second rate is faster than the first rate,
wherein the incremental data comprises data associated with changes in the absolute data and wherein an edge or a pulse is used to indicate an incremental change has occurred in the absolute data and wherein the incremental data comprises an indication of an error and wherein the absolute data comprises a Pulse Width Modulation (PWM) signal and wherein the PWM signal comprises an indication of an error and wherein the error indication by the PWM signal comprises one or more of changing the PWM signal to a high impedance signal, decreasing a frequency of the PWM signal, and setting a duty cycle of the PWM signal to a predetermined duty cycle.

19. A sensor integrated circuit (IC), comprising:
a sensing element configured to sense a parameter associated with a target;
a processor coupled to the sensing element and configured to generate a sensed signal indicative of the parameter associated with the target; and
an output module coupled to receive the sensed signal and configured to:
transmit absolute data on a message line at a first rate; and
transmit incremental data on one or more index lines at a second rate, wherein the second rate is faster than the first rate,
wherein the incremental data comprises data associated with changes in the absolute data and wherein an edge or a pulse is used to indicate an incremental change has occurred in the absolute data and wherein the incremental data comprises an indication of an error and wherein the sensed parameter associated with the target is a position of the target, the absolute data is the position of the target, and the incremental data is a change in the position of the target and wherein the incremental data comprises an indication of a direction of movement of the target and wherein a first direction is indicated by a first incremental data pulse width and a second direction is indicated by a second incremental data pulse width and wherein presence of an error comprises a change of a signal level of the incremental data.

20. A sensor integrated circuit (IC), comprising:
a sensing element configured to sense a parameter associated with a target;
a processor coupled to the sensing element and configured to generate a sensed signal indicative of the parameter associated with the target; and
an output module coupled to receive the sensed signal and configured to:
transmit absolute data on a message line at a first rate; and
transmit incremental data on one or more index lines at a second rate, wherein the second rate is faster than the first rate,
wherein the incremental data comprises data associated with changes in the absolute data and wherein an edge or a pulse is used to indicate an incremental change has occurred in the absolute data and wherein the incremental data comprises an indication of an error and wherein the sensed parameter associated with the target is a position of the target, the absolute data is the position of the target, and the incremental data is a change in the position of the target and wherein the incremental data comprises an indication of a direction of movement of the target and wherein a first direction is indicated by a first incremental data signal level and a second direction is indicated by a second incremental data signal level and wherein presence of an error comprises a pulse width of the incremental data.

21. A sensor integrated circuit (IC) having a power connection, comprising:
a sensing element configured to sense a parameter associated with a target;
a processor coupled to the sensing element and configured to generate a sensed signal indicative of the parameter associated with the target; and
an output module coupled to receive the sensed signal and configured to:
transmit absolute data on a message line at a first rate; and
transmit incremental data on the power connection at a second rate, wherein the second rate is faster than the first rate,
wherein the incremental data comprises data associated with changes in the absolute data.

22. The sensor IC of claim 21, wherein an edge or a pulse is used to indicate an incremental change has occurred in the absolute data.

23. A sensor integrated circuit (IC), comprising:
a sensing element configured to sense a parameter associated with a target;
a processor coupled to the sensing element and configured to generate a sensed signal indicative of the parameter associated with the target; and
an output module coupled to receive the sensed signal and configured to:
transmit absolute data on a message line at a first rate; and
transmit incremental data on one or more index lines at a second rate, wherein the second rate is faster than the first rate,
wherein the incremental data comprises data associated with changes in the absolute data and additional data.

24. The sensor IC of claim 23, wherein the additional data is associated with at least one of diagnostic data and synchronization data.

25. The sensor IC of claim 23, wherein the incremental data and the additional data have at least one of different signal levels or different pulse widths.

26. A sensor integrated circuit (IC), comprising:
a sensing element configured to sense a parameter associated with a target;
a processor coupled to the sensing element and configured to generate a sensed signal indicative of the parameter associated with the target; and
an output module coupled to receive the sensed signal and configured to:
transmit absolute data on a message line at a first rate; and
transmit incremental data on one or more index lines at a second rate, wherein the second rate is faster than the first rate,
wherein the incremental data comprises data associated with changes in the absolute data and wherein an edge or a pulse is used to indicate an incremental change has occurred in the absolute data and wherein a resolution of the incremental change is adjustable and wherein the sensed parameter associated with the target is a position of the target, the absolute data is the position of a target, the incremental data is a change in the position of the target, and the resolution of the incremental change is dynamically varied based on a speed of movement of the target.

* * * * *